(12) United States Patent
Magnani

(10) Patent No.: US 6,173,751 B1
(45) Date of Patent: Jan. 16, 2001

(54) BURST PROTECTION DEVICE FOR TIRE REMOVING MACHINES

(75) Inventor: Franco Magnani, Correggio (IT)

(73) Assignee: MACIS S.r.l., Correggio (IT)

( * ) Notice: Under 35 U.S.C. 154(b), the term of this patent shall be extended for 0 days.

(21) Appl. No.: 08/968,866

(22) Filed: Nov. 5, 1997

Related U.S. Application Data

(63) Continuation-in-part of application No. 08/604,696, filed on Feb. 21, 1996, now abandoned.

(30) Foreign Application Priority Data

Oct. 2, 1995 (IT) .............................................. MO95A0136
Oct. 23, 1995 (IT) .............................................. MO95A0148

(51) Int. Cl.⁷ .................................................. B60C 25/135
(52) U.S. Cl. ......................................... 157/1.24; 157/1.1
(58) Field of Search ............................... 157/1, 1.1, 1.17, 157/1.24

(56) References Cited

U.S. PATENT DOCUMENTS 4,742,859   5/1988   Mannen .

OTHER PUBLICATIONS

Automation Engineering—pp. 64–66—Dec. 20, 1993 (First Edition)—S.C. Kuo and S.C. Liu.

*Primary Examiner*—James G. Smith
(74) *Attorney, Agent, or Firm*—Guido Modiano; Albert Josif

(57) ABSTRACT

A burst protection device for tire removing machines of the type having a platform on which a wheel can be located and an arm supporting a bead extractor, the burst protection device comprising a wheel locking member for centering and fixing a wheel on the platform and a clearance signal-producing device which is actuatable upon fixing of the wheel on the platform through the locking member; the signal-producing device controls operation of the machine in only an active intervention stage of the wheel locking member.

18 Claims, 6 Drawing Sheets

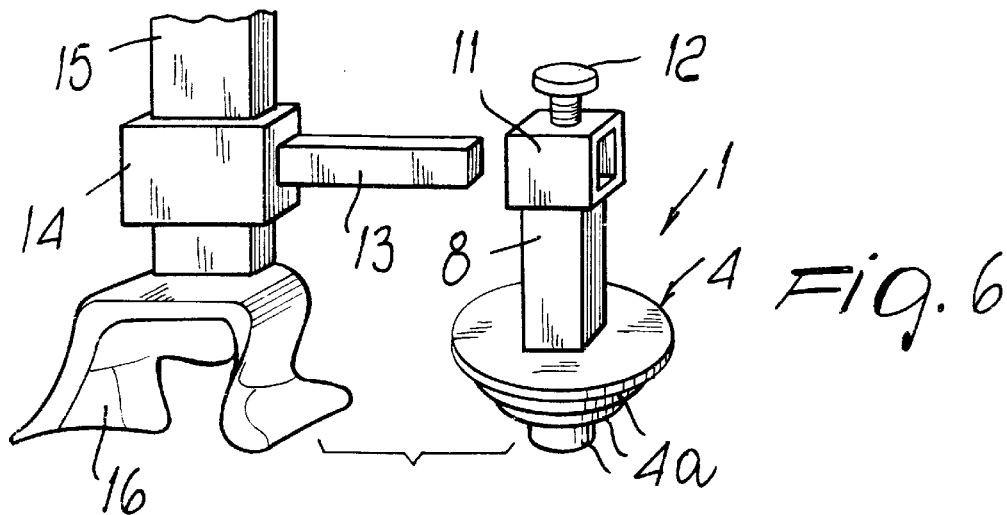
Fig. 6
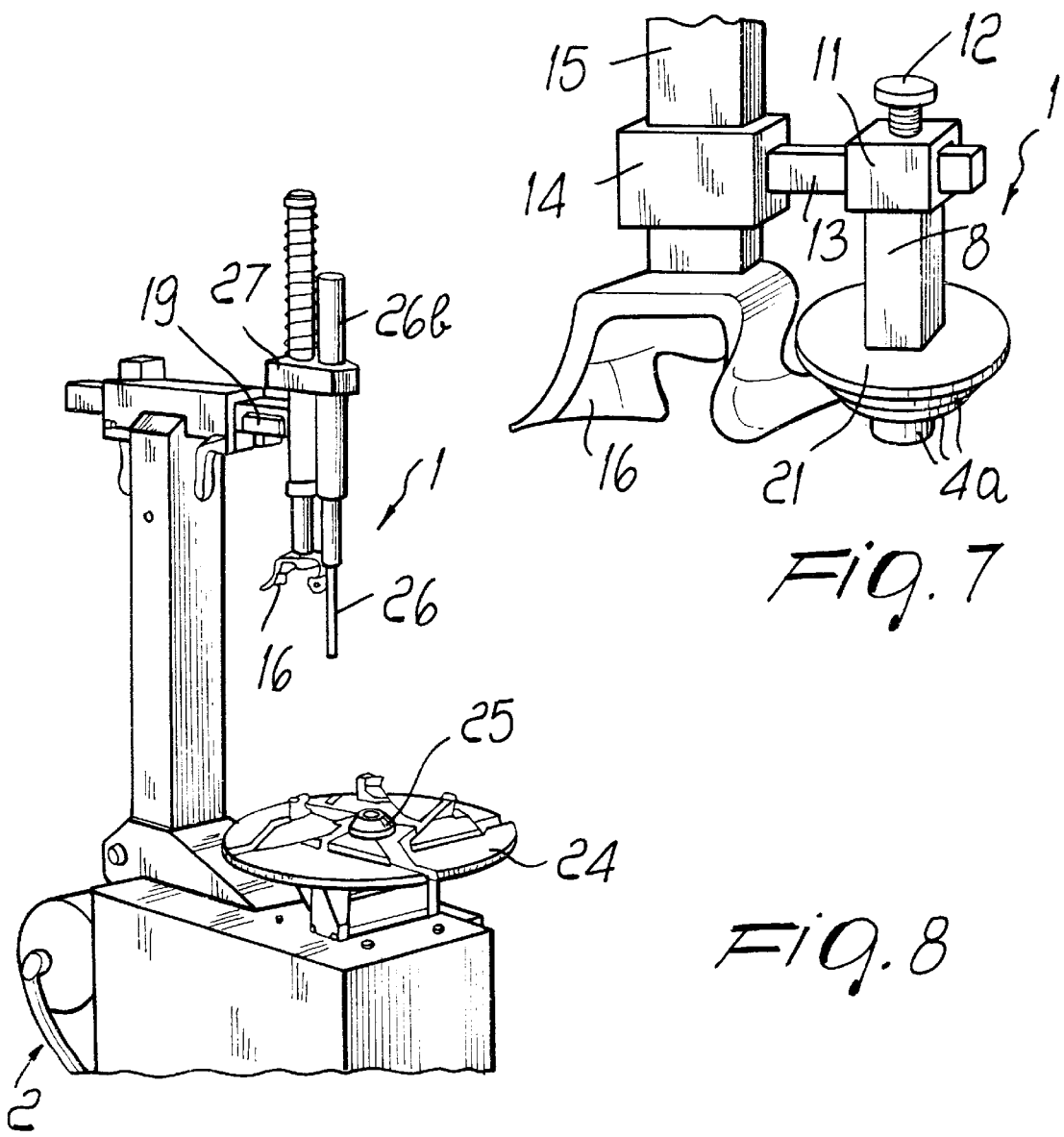
Fig. 7
Fig. 8

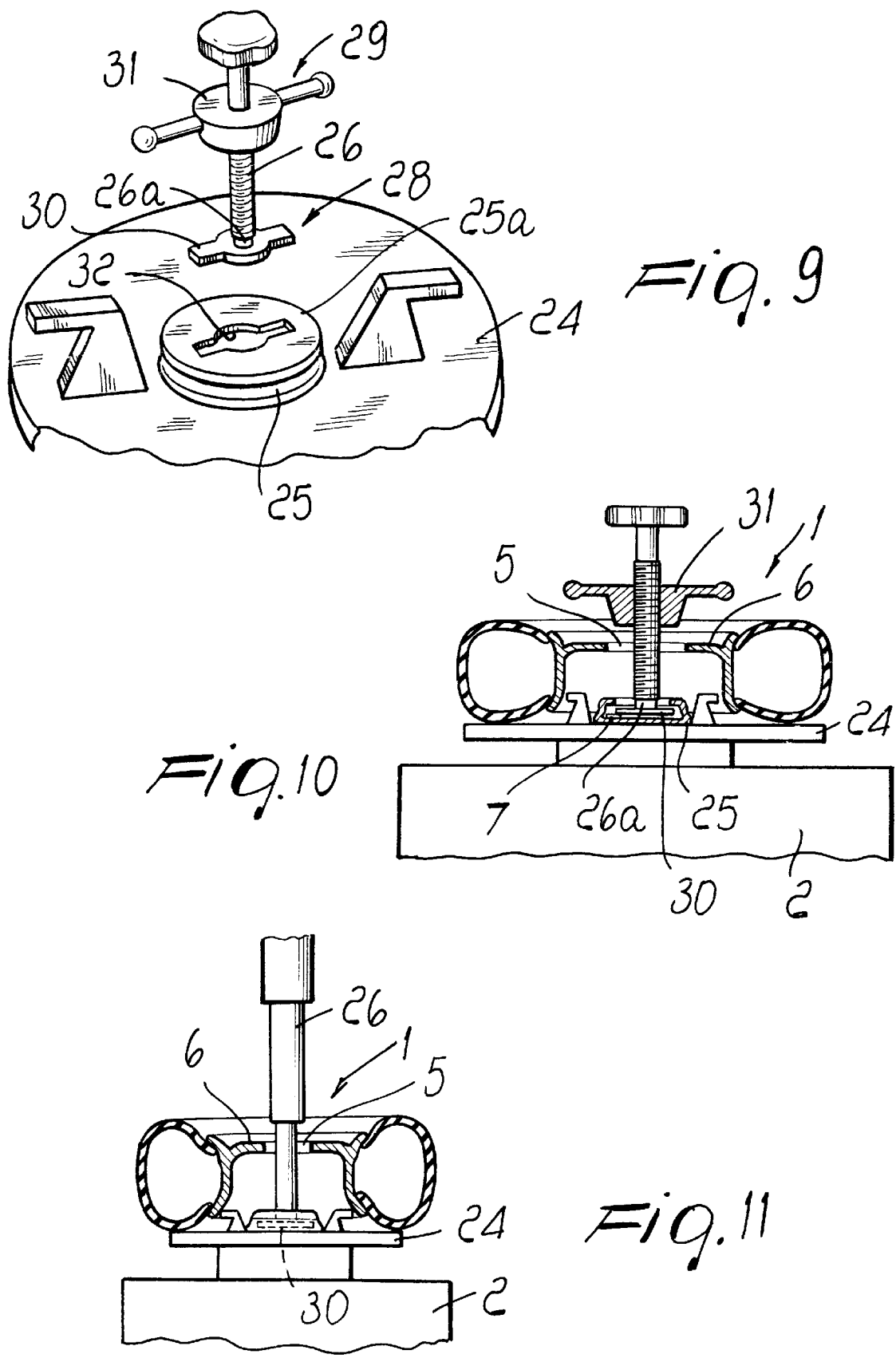

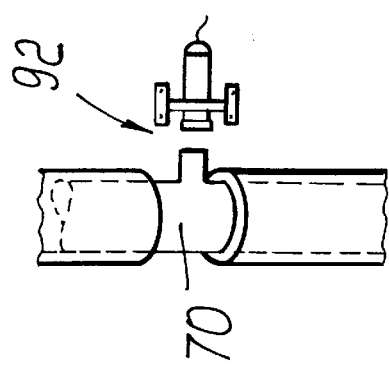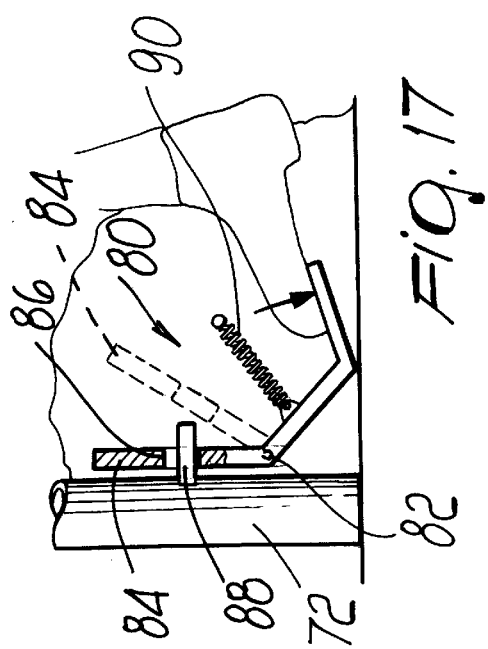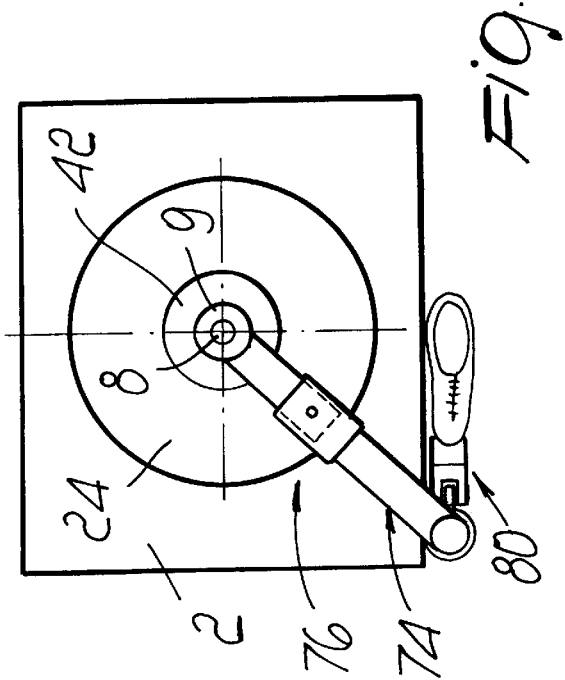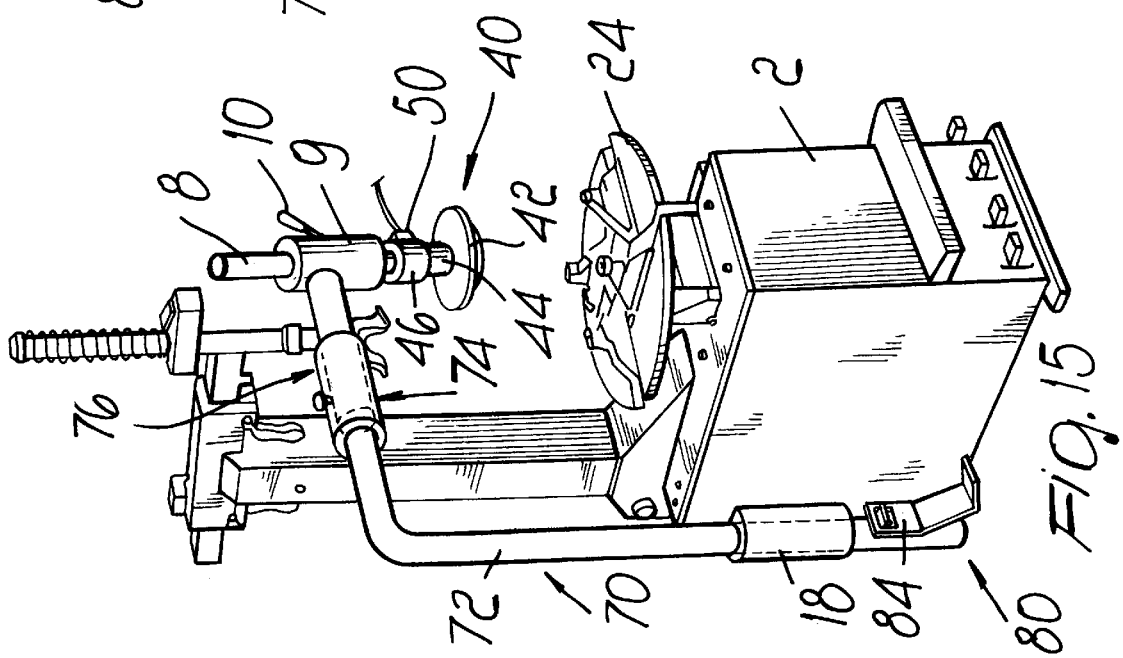

BURST PROTECTION DEVICE FOR TIRE REMOVING MACHINES

This is a continuation-in-part of application Ser. No. 08/604,696, filed on Feb. 21, 1996, now abandoned.

BACKGROUND OF THE INVENTION

The present invention relates to a burst protection device for tire removing machines.

When performing work on motor vehicle wheels that entails removing the tire from the wheel and reinstalling it, a serious safety problem related to the inflation of said tire arises.

In case of bursting, the shock wave produced by the air that strikes the operator combines with the violent movement that the wheel undergoes under the thrust of said air.

The event becomes even more severe if the tearing of the tire occurs on the sidewall that is directed toward the worktable of the tire removing machine; said worktable becomes a wall for upward propulsive thrust both for the tire and for the wheel.

In order to solve this dangerous problem, straps are currently used whose corresponding ends are rigidly coupled to the tire removing machine and, after securing the tire in the upward region, are coupled by means of their diametrically opposite ends, with appropriate spring-catches, to an eyebolt that is anchored to the frame of said machine.

Another means used to secure the tires is constituted by a frame that is made of metallic tubular material, is pivoted on one side to the footing of the tire removing machine, and has, on the other side, an engagement seat again for a safety strap which can in turn be rigidly coupled to said eyebolt.

However, it has been observed that due to the violence of the burst, said straps are absolutely insufficient to retain the wheel on the machine; when the burst occurs, said wheel in fact tends to squeeze between said straps, wedging between them, or even tears the eyebolt for coupling the closure spring-catches, even if said metal tube frame is used, or tears the very mesh of the straps, or strips the teeth of their windup mechanism, equally striking the operator, who must stay next to the tire removing machine in order to work on the tire.

Moreover, the operator, due to hurrying and to overconfidence caused by habitual use of the machine, sometimes deliberately does not use the safety straps, with imaginable consequences in case of bursting.

SUMMARY OF THE INVENTION

The aim of the present invention is to solve the above mentioned problems of the prior art, by providing a burst protection device for tire removing machines that is absolutely effective in case of intervention, is easy to operate, has a simple structure, and forces the operator to use it without any kind of exception.

In accordance with a preferred aspect of the invention, there is provided a burst protection device for tire removing machines which is characterized by comprising:

a presser means releasably engageable substantially centrally on a rim of a wheel located on a platform of the tire removing machine such as to block an axial movement of the wheel away from said platform; and a clearance signal-producing device which is actuatable when the presser means engage the rim of the wheel, in which the signal-producing device controls operation of the machine in only an active intervention stage of the presser means.

Advantageously, said burst protection device for tire removing machines is characterized in that said presser means is constituted by a straight rod that is mounted so that it is slidingly guided in a vertical sleeve that is in turn supported by corresponding means associated with said machine, said rod supporting said self-centering adapter at its lowermost end, conventional devices being provided for locking the rod in the sleeve.

Conveniently, said burst protection device for tire removing machines is characterized, as an alternative, in that said presser means is constituted by a vertical rod of preset length which supports, at its lowermost end, said self-centering adapter body and rigidly supports, at its uppermost end, a transverse sleeve inside which it is possible to insert, and lock with corresponding conventional elements, a pin that protrudes radially from a collar that is rigidly fitted on the conventional vertical rod that supports the bead extractor tool.

Still in another variant the burst protection device is characterized in that said wheel locking means comprises a female cylindrical element that is mounted centrally so as to partially protrude upward on the platform for the ordinary resting and retention of the wheels on the machine, said element being provided, in an upward region, with a partial closure diaphragm that is crossed by an opening that is shaped so as to allow the corresponding end of a straight rod to be inserted coaxially, said rod being adapted to pass at right angles through the wheel in the hub hole, preventing its movements from said platform.

BRIEF DESCRIPTION OF THE DRAWINGS

Further characteristics and advantages will become apparent from the description of a preferred embodiment of a burst protection device for tire removing machines, illustrated only by way of non-limitative example in the accompanying drawings, wherein:

FIGS. 1 and 2 are views of a conventional tire removing machine, to which the protection device, manufactured according to two different embodiments, has been applied;

FIGS. 6 and 7 are views of still another simplified embodiment of the presser means, respectively during preparation and during use.

FIG. 8 is a view of a conventional type of tire removing machine, to which a protection device manufactured according to a further embodiment has been applied;

FIG. 9 is a detail view of the protection device of FIG. 8 in its main components;

FIGS. 10 and 11 are schematic sectional views of the protection device of two still further embodiments, both of which are shown in the configuration for acting on a wheel;

FIG. 15 is a perspective view of a further embodiment of the burst protection device according to the invention in a tire removing machine;

FIG. 16 is a plan view of the burst protection device of FIG. 15;

FIG. 17 shows a detail of a device for releasably blocking the rotation of rotatable arm of the device of FIGS. 15 and 16; and FIG. 18 is a detail view of a sensor for detecting the position of a rotatable arm of the burst protection device according to the invention.

DESCRIPTION OF THE PREFERRED EMBODIMENTS

Figures 1, 2:
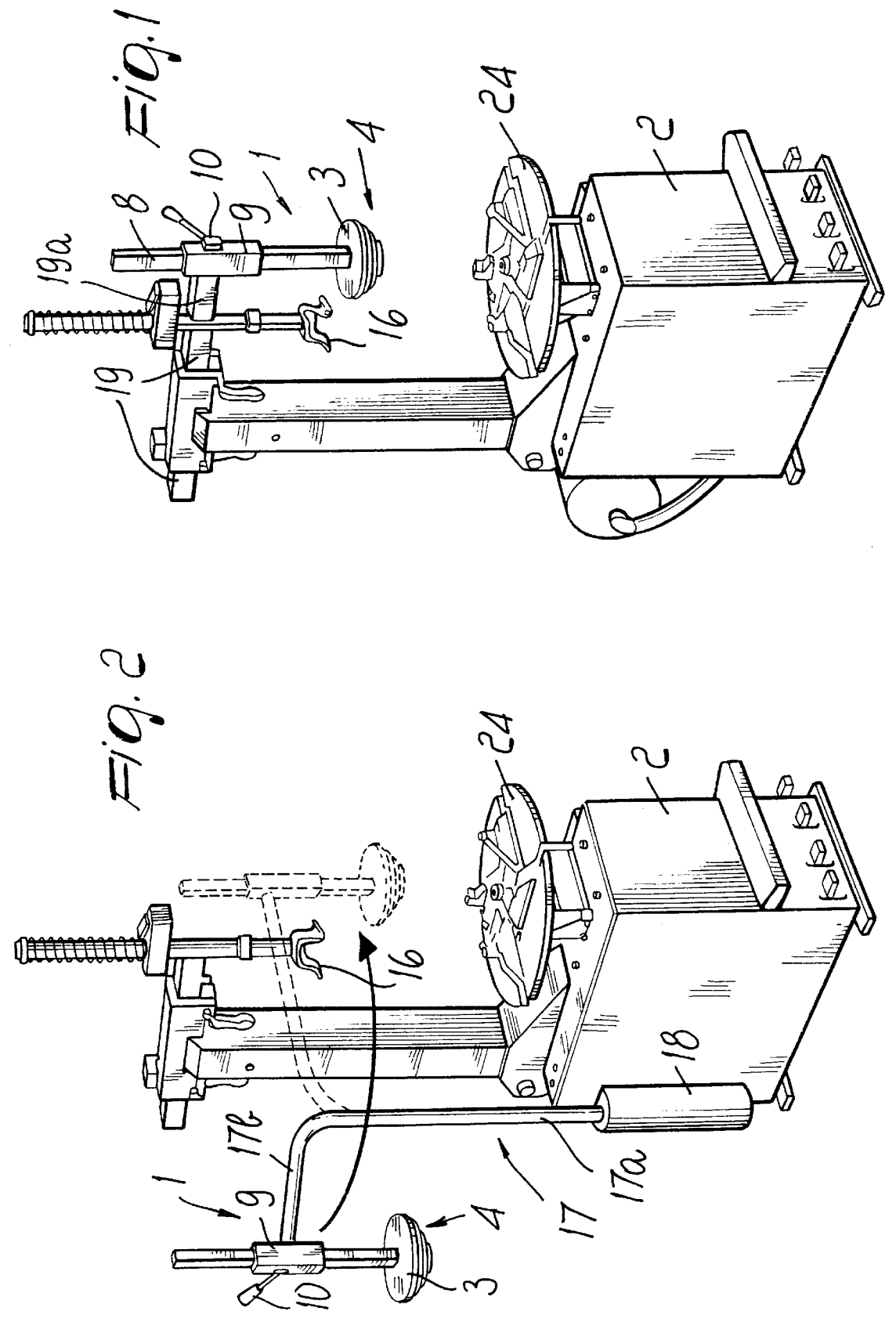
Figure 3:
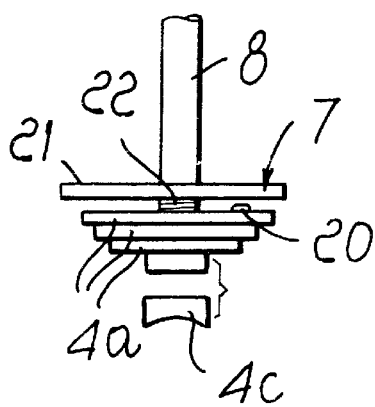
FIG. 3 is a detail view of a self-centering adapter body.
Figure 4:
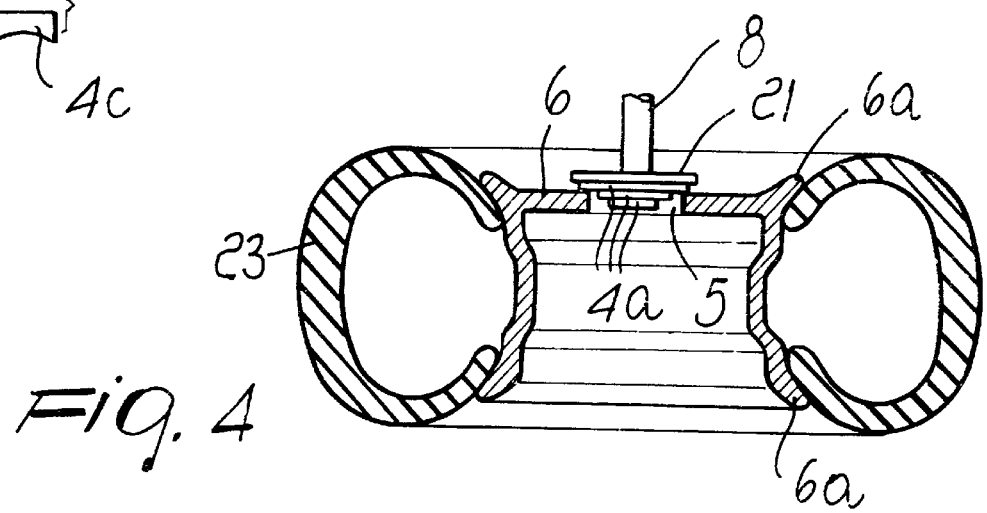
FIG. 4 is a detail view of said body in a configuration for intervention on a wheel.
Figure 5:
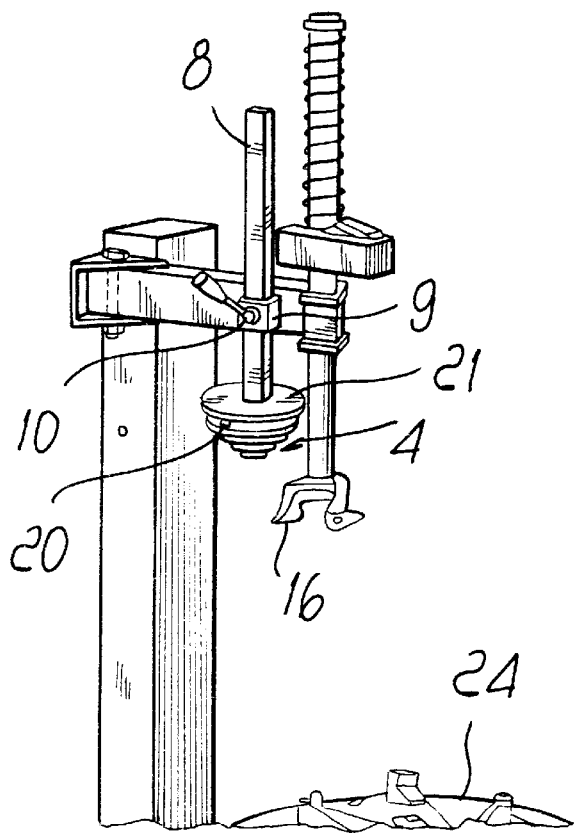
FIG. 5 is a view of another embodiment of the burst protection device.

With reference to FIGS. 1 to 7, the reference numeral 1 generally designates a wheel locking means of a burst protection device for tire removing machines 2, which is constituted by a presser means 3 that can be mounted, with corresponding elements that are better specified hereinafter, on said machines 2.

The presser means 3 is provided with a self-centering adapter body 4 which, in the preferred embodiment, can be snugly inserted coaxially in the central hole 5 of a wheel 6 that is normally provided for adapting to the hub.

Said presser means 3 is also provided with clearance signal-producing devices 7 that control the operation of the machine 2 only during the active intervention stage of said presser means.

The presser means 3 is substantially constituted by a straight rod 8 that is mounted, so that it is slidingly guided, in a vertical sleeve 9 which is in turn supported by corresponding means, described hereinafter, that are associated with the machine 2.

Said rod 8 supports the self-centering adapter 4 at its lowermost end, and the sleeve 9 is provided with conventional devices for locking the rod 8 therein, which are constituted for example by a clamp or vice, designated by the reference numeral 10 in the figures; as an alternative, a conventional hydraulic/pneumatic clamping unit can be used.

In a further possible embodiment of the presser means 3, said presser means is again constituted by a vertical rod 8 of preset length that again supports, at its lowermost end, the self-centering adapter body 4, whereas at its upper end it supports a transverse sleeve 11 that is rigidly coupled thereto; a pin 13 can be inserted and locked inside said sleeve 11 with conventional elements, for example a through presser screw 12; said pin protrudes radially from a collar 14 that is rigidly fitted on the conventional vertical rod 15, which supports the bead extractor tool 16 on the tire removing machine 2.

The rod 8 has a polygonal, generally square, cross-section, to form a coupling with a single degree of axial freedom with the corresponding hole of the vertical sleeve 9, which also has a polygonal square cross-section.

The supporting means of said sleeve can be provided in various manners; a first one provides for an arm 17 shaped like an inverted L, whose upright 17a is rotationally articulated in a cylindrical seat 18 that is rigidly coupled to the footing of the tire removing machine 2; the transverse part 17b supports the vertical sleeve 9 at its free end, which cantilevers out.

In a further possible embodiment, said supporting means are constituted by an extension 19a of said conventional arm 19 that supports the bead extractor 16 of the tire removing machine 2; the sleeve 9 is mounted rigidly and at right angles at the end of said arm.

The self-centering adapter 4 for use on normal wheels is substantially constituted by a plurality of disks 4a that have gradually decreasing diameters starting, in the configuration for use, from an upper maximum one to a lower minimum one; said disks are coaxially assembled so as to form a pack or are obtained monolithically from a solid body, whereas for use on so-called "blind" wheels, i.e. wheels that do not have the central hole for the hub, said adapter is constituted by a concave dome 4c that can be fitted over the central portion of said wheel.

Finally, the clearance signal-producing devices 7 can be constituted either by a microswitch 20 or by a pneumatic valve, both of which can be positioned on the upper face of the disk 4a that has the largest diameter and are adapted to be activated, during the intervention of the adapter 4, by a collar 21 that is in turn loosely supported above the disks 4a, with the interposition of conventional elastic contrast means 22, by said rod 8.

In the embodiment of FIGS. 8 to 11 the burst protection device for tire removing machines 2 comprises a female cylindrical element 25 that is fitted centrally, so as to partially protrude upward, on the platform 24 for the conventional resting and retention of the wheels 6 on the machine 2.

The female element 25 is provided, in an upward region, with a diaphragm 25a that partially closes its open region and is crossed by a shaped opening 32, through which it is possible to coaxially insert the corresponding end 26a of a straight rod 26 that is adapted to pass at right angles through the wheel 6 in the hub hole 5. The rod 26 is provided, at said end 26a, with a means 28 for quick coupling to the female element 25; said means can be activated by turning through a small angle; said rod 26 can be provided, at the opposite end with respect to the means 28, with an element 29 for pressing the wheel 6 through which it passes.

In the preferred embodiment, the female cylindrical element 25 is constituted by a short stub that is rigidly and concentrically mounted on said platform 24 with its lower base, its upper base being constituted by said diaphragm 25a through which said shaped opening 32 is provided.

Said quick coupling means 28 is constituted by a plate 30 that is welded to the lower end of the rod 26 and is arranged transversely at right angles thereto; its perimeter is shaped so as to duplicate the profile of the shaped opening 32, whereas its thickness is slightly lower than the total height of the stub that constitutes the female element 25, so as to be able to rotate inside said female element when the end 26a of the rod 26 enters it in the intervention configuration, just below the diaphragm 25a.

The presser element 29 is constituted, in a first possible manually-actuated embodiment of the device 1, by a conical sleeve 31 that is internally threaded and can be screwed, so that its tapered portion is directed toward the hole 5 of the wheel 6, onto a corresponding complementary thread formed at the upper end of the rod 26.

In an alternative automatically-actuated embodiment of the presser element 29, said presser is constituted by the rod 26, which in this case has a fluid-actuated telescopic structure, whose base 26a is associated with the arm 19 that supports the bead extractor tool 16, for example with a flange 27.

The telescoping elements (or segments) are adapted to extend vertically downward, see FIG. 11, by passing through the central hole 5 of the wheel 6 arranged on the platform 24, until they again engage the cylindrical female element 25 with the end 26a.

The operation of the invention is as follows: if it is necessary to reinstall a tire 23 on the corresponding wheel 6 placed on the platform 24 of the tire removing machine 2, normally one proceeds by using the tool 16, which reinserts the sidewalls of the tire inside the keying rims 6a.

After completing this operation, the presser means 3 is activated, and more precisely the self-centering adapter 4 is placed in the central hole 5 of the wheel 6 (or the dome 4c is placed in contact with the central part of the blind wheel); automatically, the disk 4a whose diameter matches that of said hole 5 engages said hole snugly, preventing transverse movements thereof and leaving the smaller disks 4a inside the wheel and the larger ones outside.

The adapter 4 is supported by the prism-shaped rod 8, which in a first possible embodiment of the device 1 is slideably mounted inside the vertical sleeve 9, which can in turn be rigidly supported either by the appropriately provided rotating arm 17 or by the axial extension 19a of said arm 19 that supports the bead extractor tool 16, or again be rigidly coupled to one side thereof.

The simplified solution shown in FIGS. 6 and 7 shows that the device 1 can be applied directly on said tool supporting rod 15, by inserting and locking, or removing, the sleeve 11 on and from the pin 13 in each instance.

In all of the above-described cases, the device 1 is usually used as an alternative to, and after, the tool 16.

Once the adapter 4 has been positioned, the sliding of the prism-like rod 8 in the corresponding sleeve 9 is locked by acting on the clamp 10 (or by activating the equivalent fluid-actuated clamping unit), or the sliding of the sleeve 11 on the pin 13 is locked by means of the screw 12: in this manner, the wheel 6 remains rigidly pressed on the platform 24 of the machine, which therefore contributes with all the structure to the pressure applied to said wheel, which can thus be reinflated in full safety, even reaching considerable pressure peaks, as usually required in the action for the so-called bead seating of tubeless tires, and for wheels provided with a bead retention profile.

It is noted that when the adapter 4 enters the axial hole 5 of the wheel 6, the elastic means 22 gives, since it is compressed between the collar 21 and the uppermost disk 4a: said collar can thus activate, by compression, the microswitch 20 or the equivalent pneumatic valve throughout the period of use of the adapter 4, generating the electrical/pneumatic clearance signal for the normal operation of the inflator with which the tire removing machine 2 is equipped; said clearance signal would instead be missing if the adapter 4, and therefore the protection device 1, were not used prior to reinflation of the tire 23.

The operation of the invention in the embodiment of FIGS. 8 to 11 is as follows: a wheel 6, fitted with a tire, is arranged on the platform 24 and an operator performs its deflation, bead extraction, and bead reinsertion by using the tool 16 in a conventional manner.

When the tire is to be reinflated, the tool 16 is retracted upward and the operator first locks the wheel by using the wheel locking means 1.

If said device is manually actuated, as shown in FIG. 10, the operator holds the rod 26 in his hand and inserts the plate 30 in the female element 25, passing through the diaphragm 25a, passing into the opening 32, and then turning the rod 26 so that the plate 30 is not aligned with respect to the opening 32, thus locking said rod, on the thread whereof the conical sleeve 31 is screwed until its tapered portion engages the central hole 5 of the wheel 6, locking said wheel on the platform 24.

The sensor, of a conventional type, (constituting in this embodiment the clearance signal-producing means 7), is placed inside the female element 25; when locking is completed, said sensor provides the clearance signal that allows the pneumatic elements of the machine to supply the air required to reinflate the tire.

Likewise, if the embodiment of the device 1 is instead automatic, said rod 26 has a telescopic structure and is associated with the same arm 19 that supports the bead extractor tool 16.

After lifting said tool from the interaction position, after the operator has performed the various operations on the tire, before reinflating it he activates the fluid-actuated actuator with which the tire removing machine 2 is equipped; said actuator supplies the segments that compose the rod 26, extracting them until the end 26a thereof enters the female element 25; in this embodiment, the presence of the plate 30 is optional.

Once insertion has been completed, said sensor located inside the female element 25 provides the clearance signal, as described earlier, for proceeding with reinflation of the tire.

In this embodiment, the protection device 1 prevents, in case of a burst, movements of the wheel 6 transversely to the rod 25, although vertical ones are possible only along the length of the rod.

Figure 12:
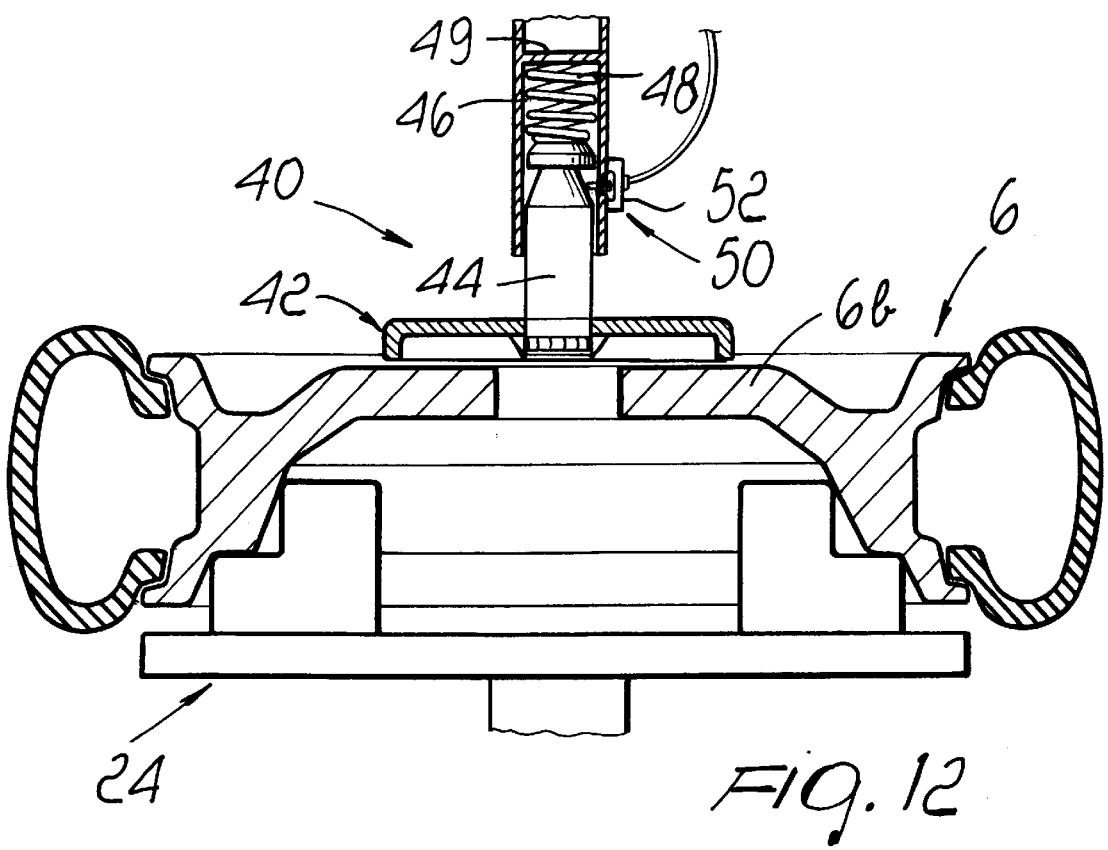
FIGS. 12–14 are sectional elevation views showing an alternative embodiment for a wheel presser element of the burst protection device according to the invention.
Figures 13, 14:
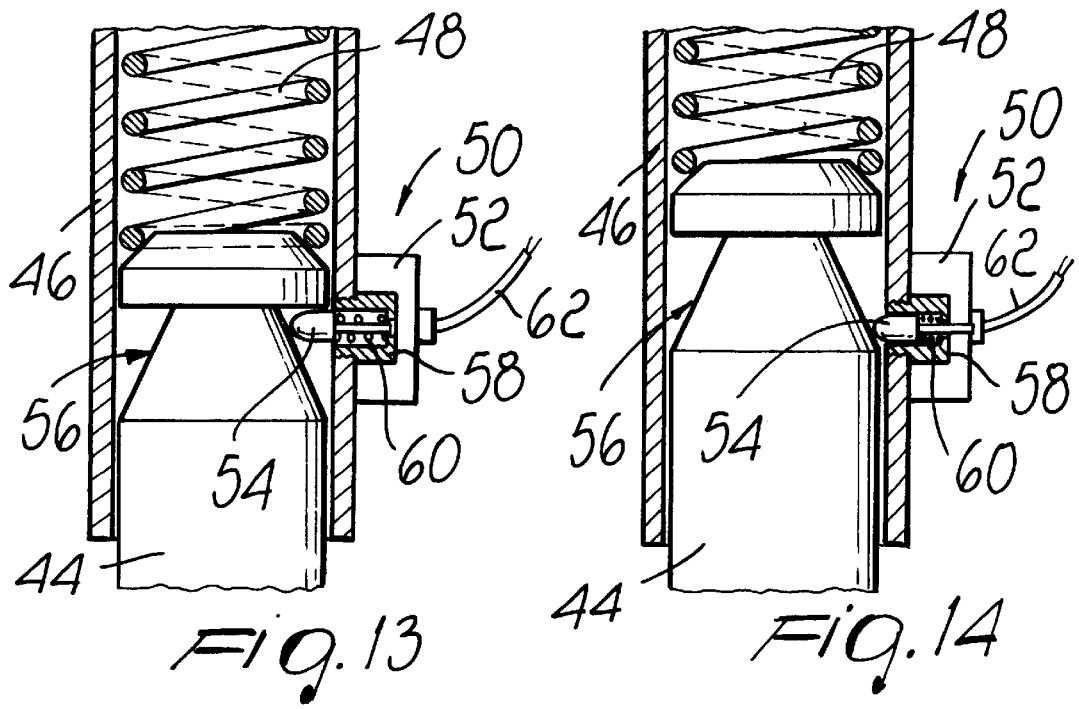

With reference now to FIGS. 12–14, a wheel presser element 40 for use in the burst protection device according to the invention is releasably engageable in an active intervention stage blocking position substantially centrally on a rim 6b of a wheel 6 located on a tire removing machine platform 24 such that in the active intervention blocking position the wheel presser element 40 blocks an axial movement of the wheel 6 away from platform 24. Wheel presser element 40 may be attached at the bottom of rod 8 described previously connected to arm 17 or arm 19, thereby wheel presser element 40 is also arrangeable distally from wheel 6 in non-blocking positions in which wheel 6 located on platform 24 is not blocked by wheel presser element 40 and is able to move axially away from platform 24.

A clearance device 50 is provided which is actuated only when wheel presser element 40 engages rim 6b of wheel 6 and is positioned in the active intervention stage blocking position in which the axial movement of wheel 6 away from platform 24 is blocked. Clearance device 50 is non-actuated in all other non-blocking positions of wheel presser element 50 in which wheel 6 located on platform 24 is not blocked by wheel presser element 40 and is able to move axially away from platform 24. Clearance device 50 controls operation of the tire removing machine such that when clearance device 50 is actuated inflation of wheel 6 is permitted exclusively in the active intervention stage blocking position of wheel presser element 40, and such that when clearance device 50 is non-actuated inflation of wheel 6 is not permitted in all other non-blocking positions of wheel presser element 40.

Wheel presser device 40 includes a plate element 42 engageable in the active intervention stage blocking position with an external side of rim 6b of wheel 6 located on platform 24. Plate element 42 is connected with clearance device 50 such that clearance device 50 is actuated when plate element 42 engages the external side of rim 6b of wheel 6 located on platform 24 in the active intervention stage blocking position.

A support structure is provided for supporting plate element 42 of wheel presser device 40, attached for example at the bottom of rod 8 connected to arm 17 or arm 19, such that plate element 42 is slidably supported on the support structure. In the illustrated embodiment, the support structure includes a rod element 44 rigidly connected to plate element 42 at one end of rod element 44, and a hollow cylindrical portion 46 inside of which rod element 44 is slidably supported. Hollow cylindrical portion 46 may be provided at one end of rod 8.

An elastic element 48 is connected with the support structure for elastically biasing plate element 42 towards the external side of rim 6b of wheel 6 located on platform 24, so that when plate element 42 engages in the active intervention stage blocking position with the external side of rim 6b of wheel 6 located on platform 24, plate element 42 is moved with respect to the support structure to overcome an elastic biasing force provided by elastic element 48 in order to actuate clearance device 50. Elastic element 48 may be in the form of an elastic spring accommodated inside hollow cylindrical portion 46 and having ends connected respectively to rod element 44 and a transverse wall portion 49.

Clearance device 50 includes an electric switch 52 having a pin 54 protruding inside hollow cylindrical portion 46 and interacting with a conical surface portion 56 provided on rod element 44. Pin 54 is slidably accommodated inside a hollow sleeve 60 of switch 52 and elastically biased towards the inside of hollow cylindrical portion 46 by means of a spring 60. As plate element 42 is moved into enragement in the active intervention stage blocking position with the external side of rim 6b of wheel 6 located on platform 24, pin 54 is pushed by conical surface portion 56 in order to close an electric circuit of switch 52 which thus sends an electronic signal via cable 62 to an inflation means of the tire removing machine for enabling the inflation of wheel 6 (FIG. 14). In all other non-blocking positions of wheel presser element 40 in which wheel 6 located on platform 24 is not blocked by wheel presser element 40 and is able to move axially away from platform 24, pin 54 is biased fully into hollow cylindrical portion 46 (FIG. 13) so as not to not close the electric circuit of switch 52 thereby the inflation means of the tire removing machine are not enabled and inflation of wheel 6 is not possible.

It is further envisaged that clearance device 50 could be in the form of a pneumatic valve which is opened in the active intervention stage blocking position of plate element 42 for sending a pneumatic enabling signal to the tire inflation means for allowing tire inflation, and which is closed in all other non-blocking positions of plate element 42 such that inflation of wheel 6 is not possible.

FIGS. 15–17 show wheel presser element 40 and clearance device 50 connected to a rotatable arm 70 arranged laterally to a base 2 of a tire removing machine, and rotatable in sleeve 18 fixed to base 2. Rotatable arm 70 includes a vertical part 72 extending along a vertical axis about which rotatable arm 70 is rotatable, and a horizontal part 74 to which wheel presser element 40 is connected, for example by means of hollow cylindrical portion 46 being connected to rod 8 vertically slidable in sleeve 9 connected to horizontal part 74 of rotatable arm 70. Horizontal part 74 comprises a releasably lockable telescopic connection 76 so as to be adjustable in length for allowing to correctly position the vertical axis of rod 8 and consequently correctly position wheel presser element 40. The previously described wheel presser 3 may also be connected to rotatable arm 70 in place of wheel presser element 40.

Rotatable arm 70 may be releasably blocked in a selected position for allowing wheel presser element 40 to be properly engaged in the active intervention stage blocking position substantially centrally on a rim of a wheel located on said platform 24. For this purpose a foot-activated blocking pedal 80 is pivoted at 82 to base 2. Blocking pedal 80 includes a plate 84 with a quadrangular opening 86 in which a tooth 88 protruding from vertical part 72 of rotatable arm 70 is blockingly and releasably engaged when rotatable arm is positioned in the selected position for allowing wheel presser element 40 to be properly engaged in the active intervention stage blocking position. The configuration of tooth 88 and opening 86 is such as to block rotatable arm 70 from rotating out of the selected position. Spring 90 biases blocking pedal 80 into its blocking position. A user may activate blocking pedal 80 to pivot it out of its blocking position (shown in dashed lines in FIG. 14) to permit rotatable arm 70 to rotate out of the selected position.

It is further possible to detect that rotatable arm 70 is positioned in the selected position for allowing wheel presser element 40 to be properly engaged in the active intervention stage blocking position. For this purpose, a photosensor 92 may be provided at rotatable arm 70 which detects when rotatable arm is positioned in the selected position, and which sends a corresponding detection signal. Such detection signal may be in the form of an added inflation enabling signal for enabling the inflation means to inflate the tire, thereby providing added protection (in addition to the inflation enabling signal provided by clearance device) according to which tire inflation may occur only when rotatable arm 70 is positioned in the selected position and clearance device 50 is actuated. It is further possible, as an alternative to photosensor 92 or in addition thereto, that the proper engagement of tooth 88 in opening 86 is such as to provide a detection signal of the proper position of rotatable arm 70 in the selected position.

It has thus been observed that the described invention achieves the intended aim.

The invention thus conceived is susceptible of numerous modifications and variations, all of which are within the scope of the inventive concept.

All the details may furthermore be replaced with other technically equivalent elements.

In the practical execution of the invention, the materials used, as well as the shapes and the dimensions, may be any according to the requirements without thereby abandoning the scope of the protection of the claims that follow.

What is claimed is:

1. In a tire removing machine of the type having a platform on which a wheel is locatable and an arm supporting a bead extractor, a burst protection device comprising:

a wheel locking means for centering and fixing a wheel on said platform, said wheel locking means comprising a presser means releasably engageable substantially centrally on a rim of a wheel located on said platform such as to block an axial movement of the wheel away from said platform; and a clearance signal-producing device being actuatable upon fixing of the wheel on said platform when said presser means engage the rim of the wheel, said signal-producing device controlling operation of the machine in only an active intervention stage of said presser means;

wherein said presser means are fitted, with corresponding elements, on said machine, said presser means being equipped with a self-centering adapter body, and said clearance signal-producing device being located at said presser means; and wherein said presser means comprises a straight rod, said rod being mounted, for being slidingly guided, in a vertical sleeve, said sleeve being supported by corresponding means associated with said machine, said rod supporting said self-centering adapter body at a lowermost end thereof, conventional devices for locking the rod in the sleeve being further provided.

2. Burst protection device according to claim 1, wherein said rod has a polygonal cross-section for coupling with a single degree of freedom to a correspondingly shaped axial hole of said vertical sleeve.

3. Burst protection device according to claim 1, wherein said means for supporting said sleeve comprise an arm that is shaped as an inverted L, with an upright portion being rotatably articulated in a cylindrical seat, said seat being rigidly coupled to the tire removing machine, and a transverse portion of said L-shaped arm supporting said vertical sleeve at a free end thereof, which cantilevers out.

4. Burst protection device according to claim 1, wherein said means for supporting said sleeve comprise an extension of said bead extractor supporting arm of the tire removing machine, said vertical sleeve being rigidly mounted at right angles, at an end of said extension.

5. Burst protection device according to claim 1, wherein said self-centering adapter body comprises a plurality of disks having diameters decreasing gradually from an upper maximum one to a lower minimum one, said disks being coaxially assembled in a pack, said adapter being snugly insertable coaxially in a central hub hole of a wheel.

6. Burst protection device according to claim 5, wherein said clearance signal-generating device comprises a microswitch, said microswitch being arranged on an upper face of a maximum diameter disk of said disks for being pressed during the intervention of the adapter by a collar, said collar being supported loosely in an upward region thereof by said rod, conventional elastic contrast means being interposed between said collar and said maximum diameter disk.

7. In a tire removing machine of the type having a platform on which a wheel is locatable and an arm supporting a bead extractor, a burst protection device comprising:

a wheel locking means for centering and fixing a wheel on said platform, said wheel locking means comprising a presser means releasably engageable substantially centrally on a rim of a wheel located on said platform such as to block an axial movement of the wheel away from said platform; and a clearance signal-producing device being actuatable upon fixing of the wheel on said platform when said presser means engage the rim of the wheel, said signal-producing device controlling operation of the machine in only an active intervention stare of said presser means;

wherein said presser means are fitted, with corresponding elements, on said machine, said presser means being equipped with a self-centering adapter body, and said clearance signal-producing device being located at said presser means; and wherein said presser means comprises a vertical rod of preset length, said rod supporting said self-centering adapter body at a lowermost end thereof and rigidly supporting, at a further uppermost end thereof, a horizontal sleeve, a pin being insertable inside said sleeve for being locked, with corresponding conventional elements, said pin protruding radially from a collar, said collar being rigidly fitted on a vertical rod of said arm that supports the bead extractor.

8. In a tire removing machine of the type having a platform on which a wheel is locatable and an arm supporting a bead extractor, a burst protection device comprising:

a wheel locking means for centering and fixing a wheel on said platform, said wheel locking means comprising a presser means releasably engageable substantially centrally on a rim of a wheel located on said platform such as to block an axial movement of the wheel away from said platform; and a clearance signal-producing device being actuatable upon fixing of the wheel on said platform when said presser means engage the rim of the wheel, said signal-producing device controlling operation of the machine in only an active intervention stage of said presser means;

wherein said presser means are fitted, with corresponding elements, on said machine, said presser means being equipped with a self-centering adapter body, and said clearance signal-producing device being located at said presser means; and wherein said self-centering adapter comprises a concave dome fittable above a central portion of a holeless wheel.

9. In a tire removing machine of the type having a platform on which a wheel is locatable and an arm supporting a bead extractor, a burst protection device comprising:

a wheel presser element releasably engageable substantially centrally on a rim of a wheel located on said platform such as to block an axial movement of the wheel away from said platform; and a clearance device which is actuated when said wheel presser device engages the rim of the wheel, said clearance device controlling operation of the machine for permitting inflation of the wheel exclusively in an active intervention stage of said wheel presser element;

wherein said wheel presser element is elastically biased in a direction towards a rim of a wheel located on said platform.

10. The burst protection device of claim 9, wherein said clearance device is mounted on said wheel presser element.

11. In a tire removing machine of the type having a platform on which a wheel is locatable and an arm supporting a bead extractor, a burst protection device comprising:

a wheel presser element releasably engageable in an active intervention stage blocking position substantially centrally on a rim of a wheel located on said platform such that in said active intervention blocking position said wheel presser element blocks an axial movement of the wheel away from said platform, said wheel presser element also being arrangeable in at least one non-blocking position in which a wheel located on said platform is not blocked by said wheel presser element and is able to move axially away from said platform; and a clearance device which is actuated by said wheel presser element engaging the rim of the wheel and only when said wheel presser element engages the rim of the wheel such that said wheel presser is positioned in said active intervention stage blocking position in which the axial movement of the wheel away from said platform is blocked, and said clearance device being non-actuated in all other non-blocking positions of said wheel presser element in which the wheel located on said platform is not blocked by said wheel presser element and is able to move axially away from said platform, said clearance device controlling operation of the machine such that when said clearance device is actuated inflation of the wheel is permitted exclusively in said active intervention stage blocking position of said wheel presser element, and such that when said clearance device is non-actuated inflation of the wheel is not permitted in all said other non-blocking positions of said wheel presser element.

12. The burst protection device of claim 11 wherein said wheel presser device comprises at least one plate element engageable in said active intervention stage blocking position with an external side of the rim of the wheel located on said platform, said at least one plate element being connected with said clearance device such that said clearance device is only actuated to permit inflation of the wheel only when said at least one plate element engages said external side of the rim of the wheel located on said platform in said active intervention stage blocking position.

13. The burst protection device of claim 12 further comprising:
   a support for supporting said at least one plate element such that said at least one plate element is slidably supported on said support; and
   an elastic element connected with said support for elastically biasing said at least one plate element towards the external side of the rim of the wheel located on said platform, whereby when said at least one plate element engages in said active intervention stage blocking position with the external side of the rim of the wheel located on said platform said at least one plate element is moved with respect to said support to overcome an elastic biasing force provided by said elastic element in order to actuate said clearance device.

14. The burst protection device of claim 13 wherein said support comprises:
   a rod element rigidly connected to said at least one plate at one end thereof; and
   a hollow cylindrical portion inside of which said rod element is slidably supported;
   said clearance device comprising an electric switch located inside said cylindrical portion for interacting with said rod element for sending an electronic signal for enabling the inflation of the wheel when said at least one plate element is engaged in said active intervention stage blocking position with an external side of the rim of the wheel located on said platform.

15. The burst protection device of claim 11 further comprising:
   a rotatable arm supporting said wheel presser element; and
   means for releasably blocking said rotatable arm in a selected position for allowing said wheel presser element to be properly engaged in said active intervention stage blocking position substantially centrally on a rim of a wheel located on said platform.

16. The burst protection device of claim 15 wherein said rotatable arm comprises a vertical part extending along an axis about which said rotatable arm is rotatable, and a horizontal part to which said wheel presser element is connected.

17. The burst protection device of claim 16 wherein said vertical part is adjustable in length.

18. The burst protection device of claim 11 further comprising:
   a rotatable arm supporting said wheel presser element; and
   means for detecting that said rotatable arm is positioned in a selected position for allowing said wheel presser element to be properly engaged in said active intervention stage blocking position substantially centrally on a rim of a wheel located on said platform.

* * * * *

UNITED STATES PATENT AND TRADEMARK OFFICE
CERTIFICATE OF CORRECTION

PATENT NO. : 6,173,751 B1
DATED : January 16, 2001
INVENTOR(S) : Franco Magnani

It is certified that error appears in the above-identified patent and that said Letters Patent is hereby corrected as shown below:

<u>Title page,</u>
Item [73] should read as follows: (73) Assignee: SICAM S.r.l., Correggio (IT)

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*